United States Patent [19]
Froberg et al.

[11] 3,842,180
[45] Oct. 15, 1974

[54] APPARATUS AND METHOD FOR STARTING AN ELECTRIC GLASS MELTING FURNACE
[75] Inventors: Magnus L. Froberg, Granville; John F. Maddux, Heath, both of Ohio
[73] Assignee: Owens-Corning Fiberglas Corporation, Toledo, Ohio
[22] Filed: Jan. 21, 1974
[21] Appl. No.: 435,043

[52] U.S. Cl. .......................................... 13/6, 13/34
[51] Int. Cl. .............................................. C03b 5/02
[58] Field of Search ................................... 13/6, 34

[56] References Cited
UNITED STATES PATENTS
3,328,153  6/1967  Augsburger .......................... 13/6 X
3,530,221  9/1970  Penberthy ............................ 13/6
3,757,020  9/1973  Steitz et al. .......................... 13/6

Primary Examiner—R. N. Envall
Attorney, Agent, or Firm—Carl G. Staelin; John W. Overman; David H. Wilson, Jr.

[57] ABSTRACT

In a furnace suitable for electrically heating molten glass, a source of electric current is connected to relatively closely spaced electrode elements for creating an initial molten state and then reconnected between at least one of the closely spaced electrode elements and at least one more widely spaced electrode for normal melting operation. Furnace start-up may be facilitated by placing material of a relatively low resistivity, as compared to the glass cullet to be melted, between the closely spaced electrode elements to establish the initial current path. Such relatively low resistivity material may typically be sodium silicate separated from the glass cullet by a glass constraint.

43 Claims, 8 Drawing Figures

APPARATUS AND METHOD FOR STARTING AN ELECTRIC GLASS MELTING FURNACE

BACKGROUND OF THE INVENTION

1. Field of the Invention

This invention relates to electric furnaces for heating molten glass and their methods of operation and more particularly to the arrangement and interconnection of electrodes for start-up and normal operation.

2. Description of the Prior Art

In the manufacture of glass, a batch of raw glass materials is generally melted in a refractory lined furnace chamber and the refined molten glass is removed as more batch material is added. Both hydrocarbon fuel burning and electric furnaces may be utilized to produce glass but the electric furnace has certain advantages with respect to the problems of air pollution and maintenance of uniform heating.

Typically, an electric furnace will have two or more electrodes submerged in the molten glass which are connected to a source of alternating current. The resisitivity of the molten glass transfers the electrical energy of the current flowing between electrodes into heat energy thereby creating Joule effect heating. Molten glass has a negative temperature coefficient and thus has resisitivity below a critical temperature which depends on the glass composition and melting parameters which is so great that electric melting cannot be sustained. The resistivity of the batch material and glass cullet are also sufficiently high so as to preclude current flow or limit it to a value less than that required to raise the furnace temperature to the operating point. Since, during normal operation, the power supply is operating at approximately 92 percent to 95 percent of maximum voltage to obtain a favorable power factor, the voltage cannot be increased to generate more current flow to start melting the higher resistivity batch or cullet and to recover electrical melting in molten glass which has been cooled below a critical temperature. Therefore, electric furnaces generally require a plurality of fuel burners positioned to direct radiant heat to the upper surface of the material in the furnace. This radiant heat melts the material until a temperature is achieved at which the resistivity of the molten glass is low enough to permit sufficient current to flow between the electrodes for normal furnace operation.

Glass which is utilized in the production of glass wool often has alkali metals, such as sodium or potassium, added as a flux to facilitate melting of the batch material and to lower the viscosity of the molten glass to decrease production time. These alkali metals also cause the molten glass to have low resistivity which aids the melting process in an electric furnace. However, some glasses, typically those utilized for the manufacture of electrical insulators generally referred to as "E" glass, have less than 1 percent alkali metal content and therefore exhibit a relatively high resistivity as compared to the wool glass, for example, 10 to 12 times that of wool glass even at the melting and refining temperatures. Further, a wool type glass may normally be refined at about 2,500°F and for a given set of parameters for electrical melting reach a critical temperature below which electrical melting retrogresses at about 2,300°F while an "E" glass will be refined at about 2,600°F and have a critical temperature of about 2,400°F for those parameters.

Flourine is often added to "E" glass as a flux to aid in placing some of the components of the batch material in solution, to reduce bubbles in the molten glass and to reduce the viscosity of the molten glass. During the melting and refining process much of this flourine is driven off along with boron and other elements which may also be included in the batch material. These emissions create air pollution problems and the flourine may combine with hydrogen in the exhaust gases from the fuel burners to form hydrogen flouride. Furthermore, the products of combustion also produce undesirable emissions. In order to militate against these factors, glass melting and refining is performed in electric furnaces employing a cold top wherein a crust of batch material covers substantially the entire upper surface of the molten glass and batch material is added to the upper surface of the crust as the lower surface is melted. However, if the electric furnace is to be restarted after the power has been interrupted for a period of time sufficient to allow the molten glass to cool to a temperature at which it has a relatively high resistivity, in the past it has been necessary to apply radiant heat to melt the cold top crust and the underlying molten glass to lower the resistivity to permit sufficient current flow for normal furnace operation. During this restart period, the undesirable emissions from the batch material and the products of combustion are generated.

SUMMARY OF THE INVENTION

The present invention is intended to overcome the air pollution problems inherent in electric furnaces which utilize fuel burners during start-up and restart operations. The products of combustion and emissions from the batch material are substantially eliminated. During start-up, a source of alternating current is connected to relatively closely spaced electrodes. Current flow can be established between the electrodes either by arcing between the electrodes, by placing a material of relatively low resistivity between the electrodes, or by applying radiant heat to provide an initial path of molten material of relatively low resistivity between the electrodes for current flow. The current flow between the electrodes melts the surrounding glass constituents until a path of molten glass of sufficiently low resistance to sustain Joule effect heating is formed between at least one of the relatively closely spaced electrodes and a more widely spaced electrode. Then the current source is disconnected from the relatively closely spaced electrodes and connected between the more widely spaced electrode and at least one of the relatively closely spaced electrodes for normal operation of the furnace.

DESCRIPTION OF THE PREFERRED EMBODIMENT

Figure 1:
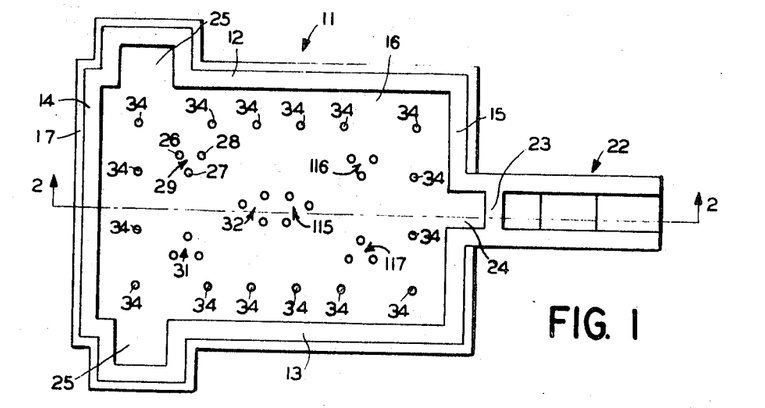
FIG. 1 is a plan view of an electric glass melting furnace utlizing the present invention.
Figures 2, 3:
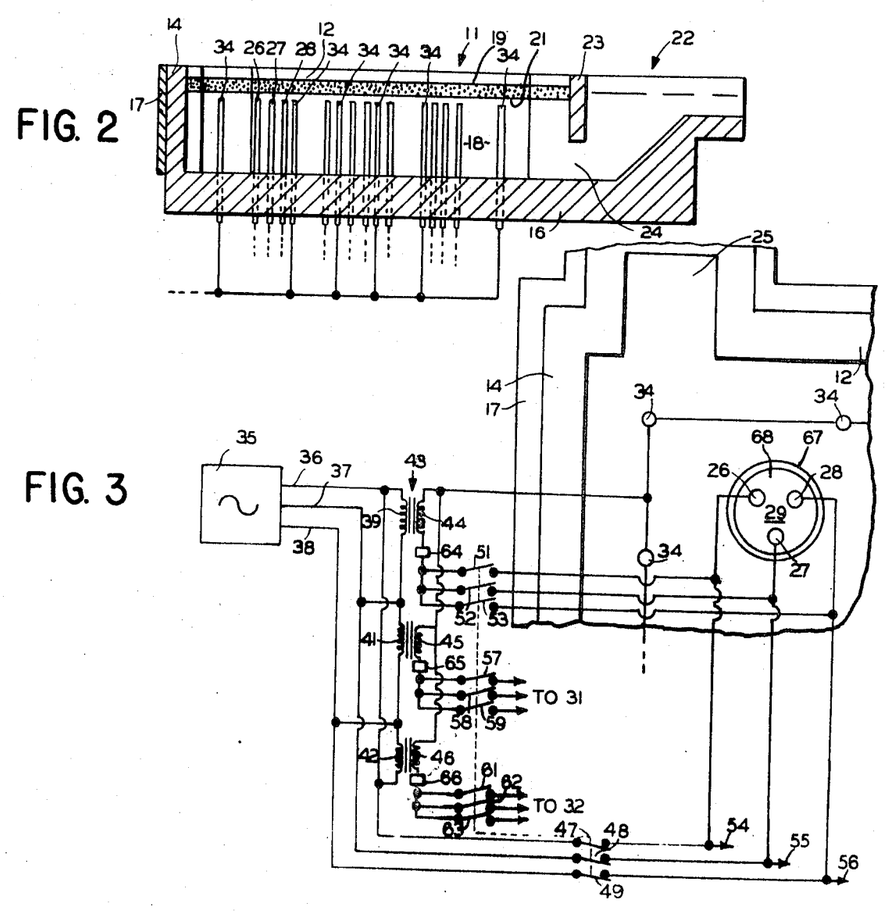
FIG. 2 is a cross-section view of the electric furnace of FIG. 1 taken along line 2—2.
FIG. 3 is a part schematic and part fragmentary plan view of the furnace of FIG. 1 (with furnace wall thickness, electrode size and electrode spacing shown without regard to proportion and scale), including a starting mode circuit of closely spaced delta connected electrodes and a running mode circuit (shown only in part) of widely spaced "Y" connected electrodes.

There is shown in FIGS. 1 and 2 an electric furnace for the resistive heating of molten glass utilizing the present invention. FIG. 1 is a plan view of a generally rectangular furnace chamber 11 comprising a pair of side walls 12 and 13, rear end wall 14, front end wall 15, and floor 16 all formed of suitable refractory materials. Walls 12 through 15 are covered by an insulating layer 17 on their external surfaces to reduce heat losses from the molten glass 18 contained in the chamber. No crown need be provided where a batch layer 19 is maintained over the melt to provide cold top operation with melting of batch at the molten glass-batch interface 21. Channel 22 of the electric furnace is separated from furnace chamber 11 by skimmer block 23 which extends into the molten glass in the area of throat 24. The refined molten glass is drawn from furnace chamber 11 through throat 24 into channel 22 and issues to a forehearth not shown. Skimmer block 23 prevents the passage of unmelted batch material and any trace substances which may be floating on the molten glass from entering channel 22. New material to be melted is added to furnace chamber 11 by conventional means, not shown, to maintain a relatively constant level of molten material. Typically, the added material is batch which can be fed at rear end wall 14 or doghouses 25 or by a traveling spreader which distributes a layer of batch material over the entire upper surface of the molten glass.

The molten glass in furnace chamber 11 is heated to a predetermined temperature by passing an electric current therethrough between immersed electrodes which extend through floor 16. The electrical resistance of the molten glass transfers the electrical energy of the current flow into heat energy thereby creating Joule effect heating. For example, relatively closely spaced electrodes 26, 27 and 28 may be connected in parallel as a group 29 to one side of a source of alternating current, not shown. Similar electrode groups 31 and 32 can be employed and where three-phase power is employed they can be located in a triangular array as shown in FIG. 1. Guard electrodes 34 are connected in parallel to the other side of the current source so that current will flow between the electrodes 26, 27 and 28, acting as a single electrode 29, and guard electrodes 34 through the molten glass 18. Where three-phase power is supplied three electrode groups 29, 31 and 32 can be arranged in a star connection, more specifically a Y for three phase operation, or a mesh connection, more specifically a delta for three phase operation.

In general, a chromic oxide refractory material is a preferred material for use in glass furnace walls since it dissolves in the molten glass much less rapidly than other refractory materials such as zircon. However, the low resistivity of the chromic oxide refractory material and the higher resistivity at the melting and refining temperatures of high resistivity glass such as "E" glass can cause a substantial portion of the current flow in an electric furnace to flow from the electrodes connected to the "hot" side of the current source through the furnace chamber walls rather than through the molten glass to an electrode connected to the "ground" side of the current source. This current flow erodes the walls and creates hot spots which result in uneven heating of the molten glass. United States Patent application Ser. No. 295,611 filed Oct. 13, 1972 in the name of George R. Machlan and entitled "Electric Furnace" discloses guard electrodes connected to the "ground" side of the current source and positioned between the furnace walls and the electrodes to the "hot" side of the current source to limit the maximum potential difference or electrical stress in the walls, preferably to less than 3 percent of the voltage applied by the current source. As shown in FIG. 1, guard electrodes 34 are positioned between electrodes 26, 27 and 28 and walls 12 through 15. Typically, guard electrodes 34 are spaced approximately twelve inches from the furnace walls and a sufficient number are provided to conduct the current without overheating and to assure that the distance between an electrode connected to the "hot" side of the power supply and the nearest wall is always greater than the distance between the same electrode and the nearest guard electrode. In FIG. 1, furnace chamber 11 is typically ten feet between end walls 14 and 15 and 6½ feet between side walls 12 and 13. 16 guard electrodes 34 are spaced from 15 to 25½ inches from one another. The electrodes connected to the "hot" side of the current source are positioned inside the rectangular area enclosed by the guard electrodes. Although the electric furnace of FIGS. 1 and 2 has been discussed in terms of melting high resistivity glass, particularly "E" glass containing 1 percent or less of alkali metals, it is to be recognized that this furnace will also melt the low resistivity glasses.

During normal operation, an electric furnace does not require the use of hydrocarbon fuel burners to maintain the molten glass at a predetermined temperature. Therefore, the upper surface of the molten glass may be covered with cool batch materials 19 which are less dense than the molten glass and float forming a substantially continuous blanket to inhibit the escape of the gases which are evolved from the batch, particularly flourine and boron gases from high resistivity glass. However, during the start-up period for the electric furnace, the glass constituents either as cullet or batch materials exhibit a relatively high resistance which, depending upon the spacing of the "hot" and "ground" electrodes, either has prevented current flow or allowed so little flow that any heat thereby generated was not sufficient to sustain the melting process. Therefore, radiant heat from fuel burners was applied to effect start-up and the upper surface of the glass constituents melts first allowing the gases to escape before the material surrounding the electrodes has been heated enough to commence electric heating. Thus a furnace system of burners, fuel supplies, a crown and flue was required for start up even though ultimate running of the furnace was by cold top electric melting which did not require this equipment. The present invention reduces the release of gases evolved from the batch and combustion gases generated during the start up period by providing means for an electrical start-up whereby the major portion of the upper surface of the batch material does not melt and continues to provide a blanket over the molten glass.

Figure 4:
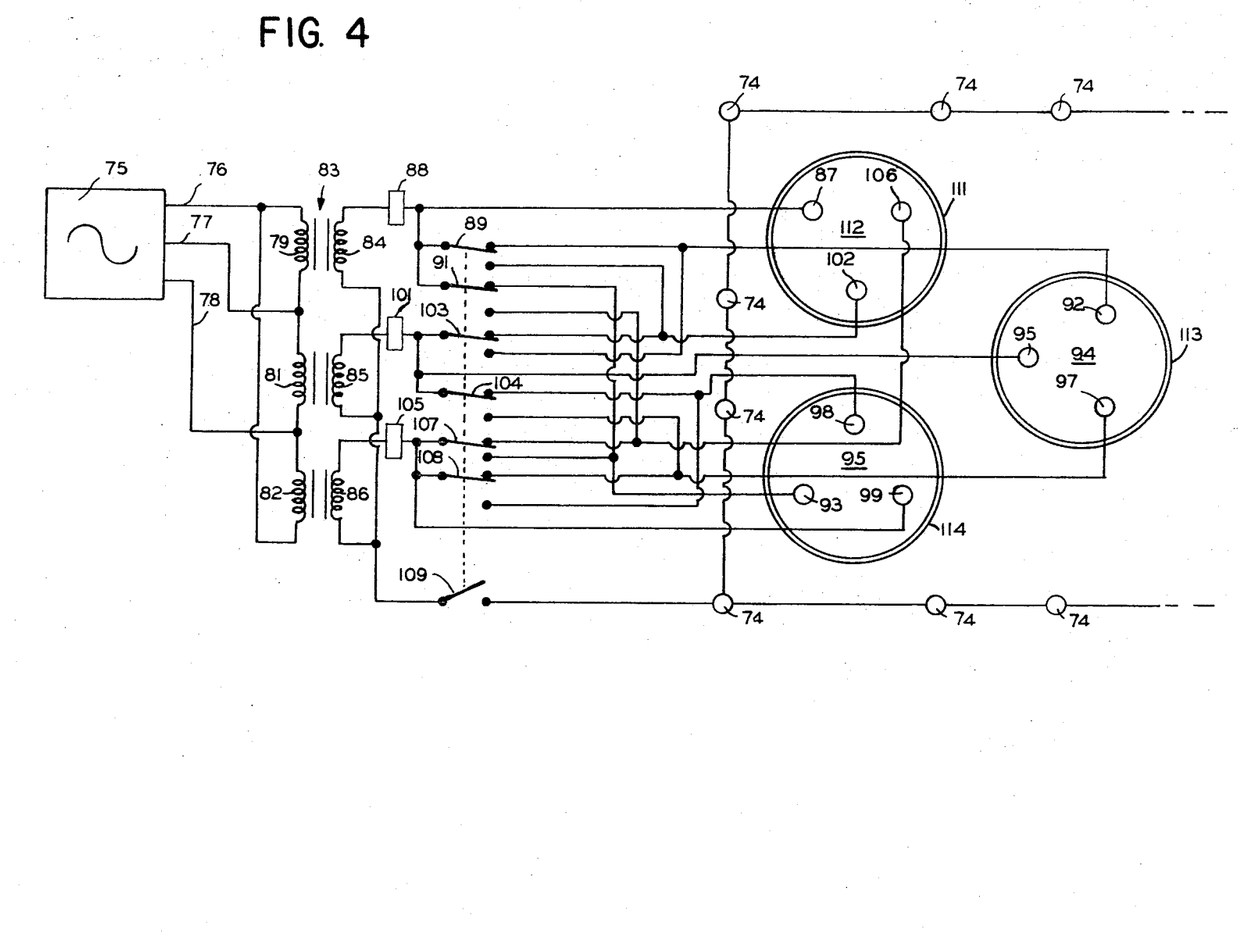
FIG. 4 is a schematic of an alternate embodiment of the circuit of this invention with both the starting mode circuit and running mode circuit employing "Y" connected groups of parallel connected electrode elements, the furnace elements being omitted.
Figures 5, 6:
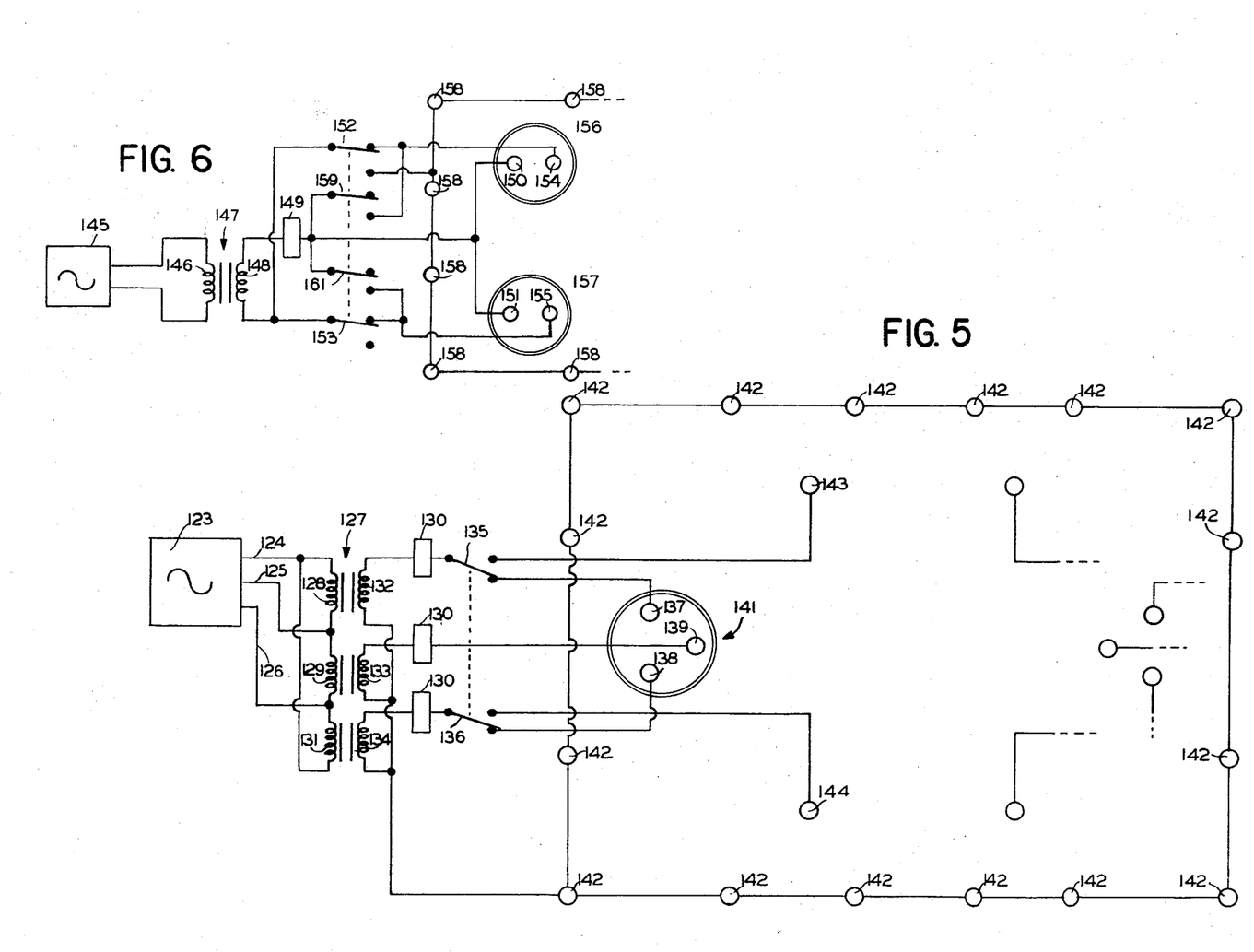
FIG. 5 is a schematic of an alternate circuit embodiment of the present invention showing an open "Y" connected starting mode and a grounded "Y" connected array of individual electrode elements for the running mode without showing the furnace structure.
FIG. 6 is a schematic of an alternate circuit embodiment of the present invention for single phase power where the starting electrode elements are paralleled for the running mode and placed in circuit with a plurality of parallel guard electrodes, no furnace elements being shown.

The starting of an electric glass melting operation by passing current through glass constituents such as batch, cullet or molten glass or a combination thereof extending between closely spaced electrodes to build up the temperature of a molten mass in the vicinity of those electrodes and thereby reduce its resistance to the passage of current lends itself to various starting circuits and starting techniques. When the molten mass has extended itself in the glass constituents sufficiently to provide an electrical path to an effective electrode and the resistance of that path is low enough to sustain or enable the build up of temperature by Joule effect heating in the molten glass a number of alternative circuits can be established for a running mode of operation. The starting mode can be between closely spaced electrodes supplied by single phase current as shown in and to be discussed with reference to FIGS. 6 and 7 or when supplied by polyphase current they can be connected in open star connection as in FIGS. 4 and 6, start connection with a neutral (not shown for starting), or in mesh connection as shown in FIGS. 3 and 8. Similar variants are available for the run mode connections further modified by the presence or absence of guard electrodes. FIGS. 3 and 4 show a run connection in the neutral star connection where the guard electrodes 34 are the neutral and the starter electrode groups are connected each with their electrodes in parallel and their groups in star connection, specifically "Y" connection. In FIG. 5 the run connection employs only one of the electrodes of a starter group in each three phase neutral "Y" connected electrode array. FIG. 8 illustrates mesh or delta connected grouped electrode arrays for running operation.

Referring to FIG. 3, there is shown in a part schematic and part fragmentary plan view the electric furnace of FIG. 1 utilizing polyphase electrical start-up mesh or delta connected closely spaced electrodes. Power supply 35 is a three-phase alternating current source with output lines 36, 37 and 38 connected between primary windings 39, 41 and 42 of transformer 43. Transformer 43 has a "delta" connected primary, windings 39, 41 and 42, and a "Y" connected secondary, corresponding windings 44, 45 and 46. During normal operation, start-up switches 47, 48 and 49 are open to electrode groups while run switches 51, 52 and 53 are closed to connect electrode elements 26, 27 and 28 in parallel as group 29 to secondary winding 44 which is supplied with the first phase from power supply 35 as an alternating voltage is generated between output lines 36 and 37 across primary winding 39. Guard electrodes 34 are connected to the common connection for secondary windings 44, 45 and 46. The alternating voltage induced in secondary winding 44 will produce current flow between electrode elements 26, 27 and 28, acting as a single electrode, and guard electrodes 34 through the molten glass to maintain uniform heating at a predetermined temperature through Joule effect heating.

Electrode groups such as 31 and 32 have their individual electrodes connected as electrodes 26, 27 and 28 of group 29 through arrow headed leads 54, 55 and 56 so they are also connected in delta in each group when start switches 47, 48 and 49 are closed. Further, the electrode groups such as 31 and 32 are reconnected for the running mode to parallel electrode elements through run switches 57, 58 and 59 to group 31 and 61, 62 and 63 to group 32. These groups are thus connected in the running mode in a neutral start or "Y" connection with the fence of guard electrodes 34 as their common or neutral. Run and start switches are shown ganged to insure that the transfer to the run connections can be made only after the start connections have been opened. The remaining three electrode groups and their individual electrodes in furnace chamber 11 shown in FIG. 1 can be connected in parallel with respective electrodes and groups corresponding in the mirror image array they form to the array discussed.

The temperature of the molten glass may be varied by controlling the amount of current flowing between the electrodes. Typically, such control may be achieved by utilizing saturable core reactors or phase controlled silicon controlled rectifiers to block a portion of the current cycle as is well known in the art. The controllers may be inserted in the output lines from power supply 35 or, as shown in FIG. 3 as controllers 64, 65 and 66, they may be inserted between the secondary windings of transformer 33 and the electrodes. In the illustrated arrangement full power is applied from power supply 35 during the start mode. In the run mode the power to the electrode groups can be controlled in each phase. An advantage of this arrangement is that the high power and high current developed as the molten glass region around each group of starter electrodes is developed to cause the molten zones of sufficient temperature to provide a low resistance path between the groups and guard electrodes 34 the controllers are not required to handle this current. When the longer current paths are established in the run mode, lower level currents may be drawn and controlled by controllers 64, 65, and 66.

The present invention provides a method of electric furnace start-up wherein electric power is supplied to at least two relatively closely spaced electrodes to produce current flow between them and Joule effect heating to melt glass constituents bridging that space. After a sufficient amount of the glass constituents has been melted to provide a current path to a more widely spaced electrode, the electric power is then connected between the more widely spaced electrode and at least one of the relatively closely spaced electrodes for normal operation. In FIG. 3, power supply 35 is connected directly to electrodes 26, 27 and 28 through closed start-up switches 47, 48 and 49. The three phases of alternating voltage are imposed between electrode pair 26 and 27, pair 27 and 28 and pair 28 and 26 during the start-up mode. Run switches 51, 52 and 53 are opened to disconnect secondary windings 44 from the electrodes at this time. Electrodes 26, 27 and 28 are relatively closely spaced to provide lower resistance paths between them than are provided during normal operation by the more widely spaced electrodes. Typically, the three electrodes are right circular cylinders of about three inches diameter equally spaced about the circumference of a 5¾ inch diameter circle to form an equilateral triangle.

Generally, an electric furnace is started with a layer of glass cullet, typically about six inches, covering floor 16. Electrodes 26, 27 and 28 and guard electrodes 44 are mounted to be extended progressively into furnace chamber 11 through floor 16. During start-up these electrodes are retracted until they are essentially even with the top of the layer of glass cullet to prevent the relatively rapid erosion of the electrodes by oxidation when they are operated in an air environment. As the glass cullet is melted, more cullet or batch material is added until the level of molten glass has risen to the normal operating level for the furnace. As the glass level is rising, the electrodes are elevated to maintain their upper ends slightly below the surface of the molten glass. The electrodes must not contact the batch material as this would cause even more rapid erosion by oxidation and abrasion than the oxidation by air.

If power supply 35 is a source of relatively high voltage, an arc may be drawn between each pair of electrodes, 26 and 27, 27 and 28 and 28 and 26. Joule effect heating will melt the surrounding glass cullet and the pool of molten glass will grow larger until it intersects guard electrodes 34. When the molten glass to the guard electrodes is hot enough to lower its resistivity and the resistance of current paths therein to a level sustaining melting, start-up switches 47, 48 and 49 are opened and run switches 51, 52 and 53 for group 29, switches 57, 58 and 59 for group 31 and 61, 62 and 63 for group 32 are closed to connect each group of electrodes in parallel to act as a single electrode. Current flow between electrodes 26, 27 and 28 in parallel and guard electrodes 34 will continue to melt the layer of glass cullet and the cullet or batch material which is added to bring the furnace up to operating level and to maintain it there. Controllers 64, 65 and 66 determine the temperature of the molten glass and thereby the rate of melting by regulating the current flow. It will be appreciated that only one of electrodes 26, 27 and 28 need be connected to secondary winding 44 during normal operation.

If sufficient voltage is not available from power supply 35 for drawing an arc between electrodes, a small path of molten glass may be created between each pair of electrodes, typically a path one inch wide by ⅛ inch deep can be raised to a temperature providing a path of sufficiently low resistance to sustain growth of the molten region by Joule effect heating, by the application of radiant heat to the glass constituents. Once this path is established current will flow to provide sufficient Joule effect heating to enlarge the molten zone. As an aid to starting the furnace, the area between electrodes 26, 27 and 28 may be bridged with a material which has a lower resistivity than the constituents of glass to be produced, typically sodium silicate. More conveniently, a limited region surrounding the electrodes can be filled with this material. A glass constraint, such as cylinder 67 with closed bottom end 68 having holes therein for receiving the electrodes, is placed in furnace chamber 11 to contain the relatively low resistivity material. Starting may be accomplished by arcing or by use of radiant heat to establish current paths. Where arcing is utilized, an anhydrous sodium silicate is used and water added to prevent the formation of a crust on the electrodes which would inhibit current flow. If the glass cullet is relatively high resistivity glass, a relatively low resistivity glass cullet may be substituted for sodium silicate in the glass constraint.

Power supply 25 is operated at 90 percent to 95 percent of maximum voltage during the running mode to obtain a high power factor. Therefore, if the molten glass should cool to a critical temperature below at which the resistance between the widely spaced electrodes lowers current flow below the amount required to create enough Joule effect heating to return the molten glass to operating temperature, melting will terminate if the running mode of operation is maintained. If there shold be a power interruption and the temperature of the glass falls below the critical temperature, the furnace can't be restarted electrically when connected for normal operation. The present invention allows the furnace to be switched to the start-up connection which will restart the melting process at glass temperatures substantially below the critical temperature for Joule effect heating in the running connection. At even lower temperatures radiant heat may be applied to a localized region of the batch cover 19 to generate current paths between the closely spaced electrodes and raise the temperature of the cooled molten glass below to above the critical temperature. If a melt freezes, the electrodes may be exposed to allow the use of a relatively low resistivity material as disclosed in the method for start-up to start localized Joule effect heating between the close spaced starter electrodes and when molten glass is formed with a low enough resistance path between running electrodes the system can be switched to the running mode.

The working temperatures, temperature coefficients of resistance, resistivity, and critical temperature for sustaining Joule effect heating for a given set of heating parameters varies widely with glass composition. However, it is to be recognized that glasses of various compositions have the common characteristic of a negative temperature coefficient of resistance in the molten state. The various glasses also have a working temperature which is also dependent upon the degree of refinement required and the forming process to which the glass is to be subjected. The critical temperature at which the glass resistivity is so high that the Joule effect heating is insufficient to sustain the temperature varies with the thermal system, the given applied voltage, the electrode spacing and the electrode area. In the case of "E" glass of low alkali content employed to form continuous filaments, the working temperature is about 2,600°F and with electrodes of about 3 inches diameter spaced about 2 feet and subjected to about 360 to 480 volts r.m.s. operation by Joule effect heating alone becomes marginal at about 2,400°F. Glasses with high alkali content as are employed to produce glass wool are subjected to a working temperature of about 2,500°F and when operated with the above electrode arrangements with about 150 volts r.m.s. are marginal in their Joule effect heating at about 2,300°F. However, in the case of wool glass, recovery of the conditions for Joule effect heating alone can be accomplished from temperatures of the molten glass as low as about 1,600°F by connecting the starting electrodes in the mode disclosed herein. Similar restarting of "E" glass melts at temperatures substantially below their critical temperature can be accomplished by reconnection of the current sources across the close spaced electrodes in the starting mode.

FIG. 4 shows a circuit arrangement in which the starting circuits and running circuits are each star connected and subject to controllers. Power supply 75 is a three-phase alternating current source with output lines 76, 77 and 78 connected between the primary windings of transformer 83. Windings 79, 81 and 82 are connected together as a "delta" primary of transformer 83 which has corresponding windings 84, 85 and 86 connected as a "Y" secondary. Winding 84 is supplied with the first phase from power supply 75 through primary winding 79 and has its "hot" side connected to electrode 87. Controllers 88 regulate the current flow from each secondary winding to its connected electrodes for btoh the close spaced electrode connection for start up and the more widely spaced electrode connection for normal operation. During start-up switches 89 and 91 also connect winding 84 to electrodes 92 and 93 of two electrode groups 94 and 95 which include electrodes 96, 97, 98 and 99. The second phase from power supply 75 is induced in secondary winding 85 which is connected through controller 101 to electrode 96 and during start-up is connected to electrodes 102 and 98 through switches 103 and 104. The third phase from power supply 75 is induced in secondary winding 86 which is connected through controller 105 to electrode 99 and during start-up is connected to electrodes 106 and 97 through switches 107 and 108. The common or "ground" connection for secondary windings 84, 85 and 86 is disconnected from guard electrodes 74 by the opening of switch 109.

Each group of three electrodes is surrounded with material of relatively low resistance, typically sodium silicate, contained in a glass constraint such as for electrodes 87, 102 and 106 of group 112; glass constraint 113 for electrodes 92 96 and 97; and glass constraint 114 for electrodes 93, 98 and 99. Radiant heat may also be applied to the sodium silicate to melt a current path so that current will flow between each pair of electrodes in each group arranged in an open star connection. For example, current will flow between electrodes 87 and 102 through the molten sodium silicate and through secondary windings 84 and 85, and closed switch 103. The voltage between electrodes 87 and 102 will be the algebraic sum of the instantaneous voltage induced in secondary winding 84 minus the instantaneous voltage induced in secondary winding 85. The current flow between each pair of electrodes will create Joule effect heating to melt the material within glass constraints 111, 113 and 114 and then to melt the constraints and the material beyond them. When the melting has spread sufficiently to establish low resistance current paths between the electrode groups and gurad electrodes 74, switches 89, 91, 103, 104, 107, 108 and 109 are switched from the start to the run position.

Now electrodes 102 and 106 will be connected to secondary winding 84 through switches 89 and 91 to establish current flow between electrodes 87, 102 and 106 of group 111 acting as a single electrode, and guard electrodes 74 as a portion of a grounded or neutral star connection through the molten glass. Switch 109 is closed to complete the electrical circuit between guard electrodes 74 and secondary winding 84. In the run position, switches 103 and 104 connect electrodes 92 and 97 in parallel with electrode 96 as group 94 to secondary winding 85 while switches 107 and 108 connect electrodes 93 and 98 in parallel with electrode 99 as group 95 to secondary winding 86. Therefore, each group of three electrodes acts as a single electrode supplied with a separate phase from power supply 75 to maintain even heating in the molten glass. If the power is interrupted, switches 89, 91, 103, 104, 107, 108 and 109 may be returned to the start-up position to provide electrical start-up without external heat above approximately 1,600°F for wool glass. It will be appreciated that only one electrode in each group of three need be connected to the secondary winding during normal operation.

The use of short mode connections for start-up and long mode connections for run or normal operation as shown in FIG. 4 can be arranged for two zone, three-phase melting as shown for FIGS. 1, 2 and 3 with the electrode groups 115, 116 and 117 and then respective electrodes connected in parallel with the electrodes and groups 94, 95 and 112 or where separate control of each zone is desired with another power supply, transformer and switching matrix as shown in FIG. 4 to these electrodes and groups.

Referring to FIG. 5, there is shown an alternate embodiment of the present invention wherein only one electrode from a starter group 122 is employed in the run mode. Power supply 123 is a three-phase alternating current source having output lines 124, 125 and 126 connected between the primary windings of transformer 127. Windings 128, 129 and 131 form the "delta" connected primary of transformer 127 which has secondary windings 132, 133 and 134 connected in a "Y" configuration. Controllers 130 regulate the current flow from each secondary winding to its connected electrodes. During start-up, switches 135 and 136 connect electrodes 137 and 138 to secondary windings 132 and 134 respectively while electrode 139 is connected directly through its controller 130 to secondary winding 133 to provide an open "Y" connection. Electrodes 137, 138 and 139 are surrounded with a relatively low resistivity material, typically sodium silicate, contained by glass constraint 141. The sodium silicate may be heated to a molten state by an external radiant heat source such as a hand held oxy-acetylone welding torch (not shown) so that current will flow between each pair of electrodes. After the glass constraint has melted and the melting has spread through the glass constituents to establish low resistance current paths to guard electrodes 142, switches 135 and 136 are changed to the run position to disconnect electrodes 137 and 138 and connect electrodes 143 and 144 to secondary windings 132 and 134 and 74 respectively and form a neutral or grounded "Y" connection. Each phase from power supply 123 is therefore supplied between a separate one of electrodes 139, 143 and 144 and guard electrodes 142 to produce Joule effect heating of the molten glass. If the power is interrupted, switches 135 and 136 may be returned to the start-up position to provide electrical start-up, without external heat provided the molten glass temperature is above the previously discussed limit for such starting.

FIG. 6 shows an alternate embodiment of the present invention for use with a single phase alternating current source where the starter electrodes are all paralleled for normal operation. Power supply 145 supplies alternating current to primary winding 146 of transformer 147 having secondary winding 148. Controller 149 regulates the current flow from winding 148 to the connected electrodes. Electrodes 150 and 151 are connected to the "hot" side of secondary winding 148 through controller 149 during start-up at that time switches 152 and 153 connect electrodes 154 and 155 to the "ground" side of secondary winding 148. The space between electrode pairs 150 and 154 and 151 and 155 may be bridged with a relatively low resistivity material, typically sodium silicate, which can encompass the electrodes and can be contained in glass constraints 156 and 157. Radiant heat may be applied to melt the sodium silicate so that current will flow between each pair of electrodes to create Joule effect heating in the starting mode. When glass constraints 156 and 157 have melted and the melting has spread through the glass cullet or batch as the case may be to create low resistance current paths to the guard electrodes 158, switches 152 and 153 are changed to the run position to connect the "ground" side of secondary winding 148 to guard electrodes 158. Switches 159 and 161 are also changed to the run position to connect electrodes 154 and 155 in parallel with electrodes 150 and 151 to the "hot" side of secondary winding 148. Current will flow between electrodes 150 and 154, acting as a single electrode, and gurad electrodes 158 as well as bewteen electrodes 151 and 155, acting as a single electrode, and guard electrodes 158 to maintain uniform heating of the molten glass. If the power should be interrupted, switches 152, 153, 159 and 161 may be returned to the start-up position to provide electrical start-up, without external heat. It will be appreciated that switches 159 and 161 may be eliminated so that electrodes 154 and 155 are only connected during start-up.

In each of the preceding circuits an array or fence of guard electrodes has been shown between the electrodes connected to the hot side of the supply and the furnace wall. Many applications of the short mode starting and long mode running require no guard electrode. Such applications, when connected in a star arrangement for polyphase operation can, where a neutral electrode is desired, provide an oversized neutral electrode (not shown) located equidistant between the close spaced electrodes, as at the intersection of the bisectors of the apex angles for the equilateral triangle defined by electrodes 137, 138 and 139 for starting. For the running mode if a neutral star connection is desired the neutral electrode (not shown) could be equidistant from the run electrodes 139, 143 and 144 as by locating it on the bisector of the angle defined by 143, 139, 144 at the appropriate distance from 139. Electrode spacing and circuit parameters would be adjusted for the resistance realized during starting and running in such an arrangement. Therefore, the starter electrodes 137, 138 and 139 could be more widely spaced.

Figure 7:
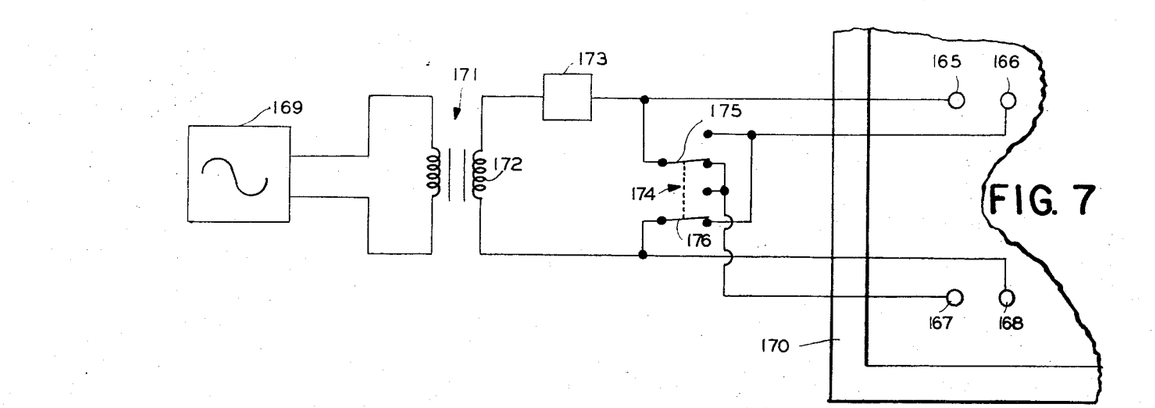
FIG. 7 is a schematic of a single phase circuit and a fragment of the furnace illustrating a starting mode between electrodes closely spaced in pairs and a running mode between the paired electrodes with each pair connected in parallel, no guard electrodes being employed.
Figure 8:
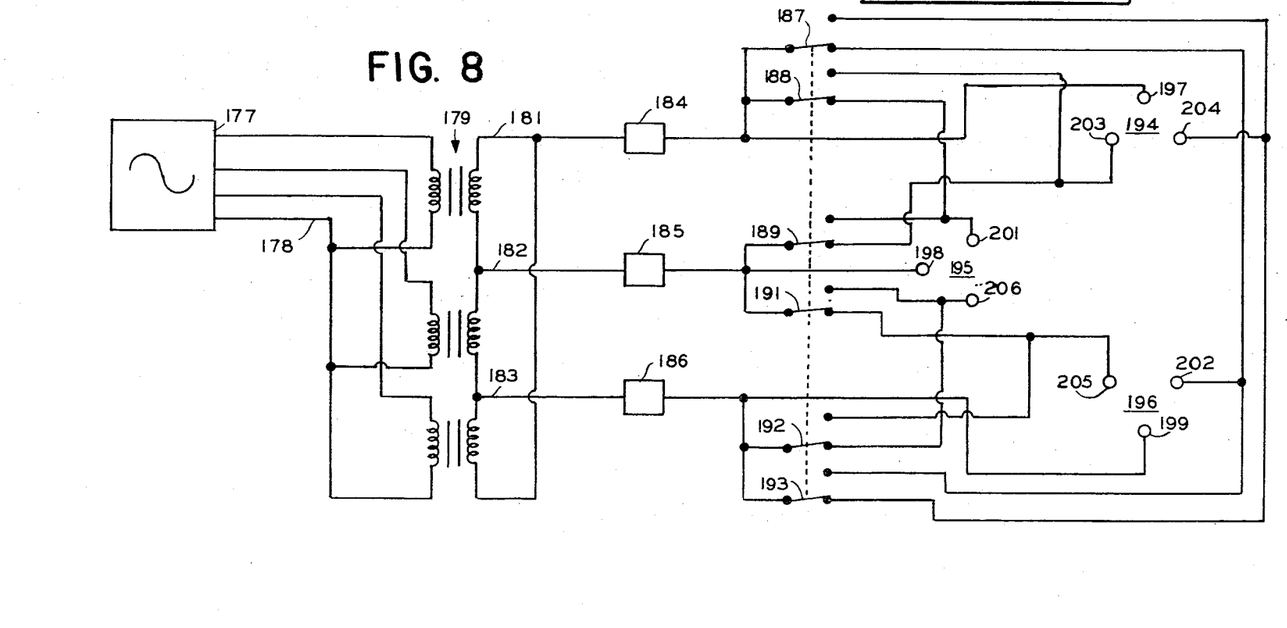
FIG. 8 is a schematic of the circuit only for an electric glass melting furnace starting on three groups each of three electrode elements connected in delta and running on the three groups connected in delta with their electrodes paralleled, no guard electrodes being employed.

Single phase circuitry for operation of a furnace zone without guard electrodes to protect the glass tank walls 170 is illustrated in FIG. 7. In this arrangement the starting currents flow between the closely spaced electrodes of each of two pairs as from 165 to 166 and 167 to 168. The running current or long mode operation is between electrode pairs having the electrodes of the pairs coupled in parallel as from 165 and 166 to 167 and 168. Power supply 169 is coupled to the electrodes through transformer 171 having a secondary 172 with controller 173 coupled directly to electrode 165 and through switching matrix 174 to electrode 166 or 167. The ground side of secondary 172 is directly coupled to electrode 168 and through matrix 174 to electrode 166 or 167.

The switches are shown in the starting mode. Switch 175 couples hot side to electrode 167 and switch 176 couples ground side to electrode 166 for starting. When Joule effect heating has developed a molten zone around each of pairs 165–166 and 167–168 and those zones have merged and reached a temperature in the space between the pairs to enable Joule effect heating between pairs 165–166 and 167–168 to proceed and expand the switches 175 and 176 can be shifted to cause conduction between pairs of the paralleled electrodes. In this case the ground side is connected to electrode 168 and through switch 176 to electrode 167 while the hot side is connected to electrode 165 and through switch 175 to electrode 166.

No constraint for the starting constituents is sbown in the embodiment of FIG. 7. The starting constituents, if of a material of lower resistivity in solid and/or molten form than the preponderance of the glass to be melted is placed in a bridging position between the pairs of electrodes to facilitate start-up in this embodiment.

A three-phase start and run circuit for the furnace electrodes connected in a mesh or delta arrangement is shown in FIG. 8. In this circuit source 177 has a neutral output 178 and three-phase outputs connected in a neutral "Y" connection to the primaries of transformer 179. The secondaries are mesh connected in a delta three-phase connection through output leads 181, 182 and 183 to controllers 184, 185 and 186.

Both the start and run modes are operated in delta. Ganged switches 187, 188, 189, 191, 192 and 193 are shown in the position for the short mode start wherein each phase is connected to one of the three closely spaced start electrodes in each of the more widely spaced groups 194, 195 and 196. One electrode of each group is permanently connected through a controller for its phase, as 197 through controller 184 and electrodes 198 and 199. The remaining electrodes of each group are transferrable by related switches between a starter group three phase delta connection and a run parallel connection in their respective group with the three groups connected in delta. The phase of lead 181 is applied to group 195 at electrode 201 through switch 188 and to group 196 at electrode 202 through switch 187 for starting and through switches 188 and 187 in their alternative positions to electrodes 203 and 204 respectively for parallel connections of electrodes in group 194 for normal heating of molten glass. Switches 189 and 191 connect the phase of lead 182 to electrode 203 of group 194 and to electrode 205 of group 196, respectively, for starting, while the paralleled connection of electrodes 201 and 206 with electrode 198 of group 195 is accomplished by placing those switches in their run position. The phase of lead 183 is coupled to each electrode group when switches 192 and 193 are in their shown start position to couple electrodes 206 and 204 of groups 194 and 195 respectively. Paralleling of all electrodes in group 196 in a connection to phase 183 is provided with switches 192 and 193 in the run position to respectively connect electrodes 105 and 202. As in the previous circuits the run connections and start connections of the electrodes are mutually exclusive by the mechanical interconnection of the switches. Also, while the electrodes employed for starting in the close spaced mode are all connected in circuit for running in the wide spaced mode it is to be appreciated that if the switches were single pole so that they were closed only during the starting the system would have a delta connected three-phase heating zone for running made up of only a single electrode 197, 198 and 199 at the apeces of the triangular array.

The short mode starting of an electric furnace for heating molten glass and the long mode running lend themselves to many variants as to the electrical connections employed in both starting and running. While low alkali glasses of high resistivity dictate relatively high voltages applied across short spacings between electrodes, low resistivity glasses can be started with relatively low voltages and relatively long spacing of the starter electrodes. Thus melting of wool glass might be started with electrodes spaced five to ten inches on centers and with voltages of about 150 volts for the closer spacing and higher voltages up to about 440 volts for the greater spacing. Running of the electric heating in wool glass can be between one or more of the electrodes employed in starting and electrodes spaced up to 8 feet from those starting electrodes, even with voltages in the 150 volt range applied.

Further variations are contemplated in the control of the currents by the controllers. While full power is desirable on start-up and the controllers are usually set at 100 percent of their capacity, separate start transformers and/or controllers can be employed. While individual controllers have been shown in each phase it is to be understood that their operation is coordinated to achieve the desired power input and power factor. Alternatively, a three-phase SCR controller can be substituted in the three-phase circuits as for controllers 88, 101 and 105 of FIG. 4.

In summary, the present invention provides for the electrical start-up of a glass furnace by applying alternating current to at least two relatively closely spaced electrodes to melt glass cullet by Joule effect heating. After the melting has spread to intersect a more widely spaced electrode the power supply is connected between the more widely spaced electrode and at least one of the relatively closely spaced electrodes for normal operation. Start-up may be aided by the application of radiant heat to melt a relatively low resistance current path between each pair of relatively closely spaced electrodes and/or by providing a relatively low resistivity material between close spaced starter electrode pairs. The relatively low resistivity material may be contained by a glass constraint which will be melted and absorbed into the molten glass.

While there is explained and illustrated the preferred embodiment of my invention, it is to be understood that many variations in the method of and apparatus for bringing glass up to a temperature for normal electric melting are within the concept of the invention. Accordingly, it is to be appreciated that the invention may be practiced otherwise then as specifically illustrated and described.

We claim:

1. An electric furnace for resistive heating of molten glass, comprising:
    a chamber for containing glass constituents;
    a source of alternating current;
    first and second electrodes positioned within said chamber a first distance apart and adapted to engae the constituents to define therein relatively short electrical current paths therebetween;
    a third electrode positioned within said chamber a second distance greater than said first distance from said first electrode and adapted to engage the constituents to define therein relatively long electrical current paths between said first and third electrodes;
    switching means for connecting said current source selectively between said first and second electrodes and between said first and third electrodes.

2. An electric furnace as defined in claim 1 including second switching means for selectively connecting said second electrode in parallel with said first electrode.

3. An electric furnace as defined in claim 2 including means to actuate said second switching means to connect said first and second electrodes in parallel in conjunction with the connection of said current source between said first and third electrodes.

4. An electric furnace as defined in claim 1 including a source of a second phase of alternating current; a fourth electrode positioned within said chamber and adapted to engage the constituents to define therein electrical current paths of the same magnitude of length as said relatively short paths between said fourth electrode and one of said first and second electrodes; and second switching means for selectively coupling said source of said second phase between said fourth electrode and one of said first and second electrodes.

5. An electric furnace as defined in claim 4 including third switching means for selectively coupling said fourth electrode in parallel with one of said first and second electrodes.

6. An electric furnace as defined in claim 1 including a constraining element of a material adapted to be melted into the molten glass and encompassing said first and second electrodes to retain a material which is to be heated by the Joule effect in contact with said electrodes.

7. An electric furnace as defined in claim 1 wherein the surfaces of the first and second electrodes are spaced of the order of inches in the regions adapted to engage the constituents and the surfaces of the first and thrid electrodes are spaced of the order of feet in the regions adapted to engage the constituents.

8. An electric furnace as defined in claim 1 wherein the electrodes are right circular cylinders extending generally vertially in the regions adapted to engage the glass constituents, and wherein the adjacent surfaces of first and second electrodes are spaced about diameter of one of said electrodes.

9. An electric furnace as defined in claim 1 wherein said source imposes a voltage of about 150 volts, said electrodes are right circular cylinders of about three inches diameter oriented vertically, said first and second electrodes are spaced about five inches center to center and said third electrode is spaced about two feet from said first electrode.

10. An electric furnace as defined in claim 1 including a fourth electrode positioned within said chamber in proximity to said third electrode and adapted to engage the constituents to define therein relatively short electrical paths between said third and fourth electrodes; and switching means for connecting said current source selectively between said third and fourth electrodes while said first-mentioned switching means connects said current source between said first and second electrodes.

11. An electric furnace as defined in claim 10 wherein said source has a first and second terminal and including second switching means for connecting said first and second electrodes in parallel to said first terminal of said source and said third and fourth electrodes in parallel to said second terminal of said source.

12. An electric furnace for resistive heating of molten glass, comprising:
 a chamber for containing glass constituents;
 a polyphase source of alternating current;
 a plurality of groups of electrodes each including more than two electrodes, the electrodes of each group being positioned within said chamber and adapted to engage the glass constituents to define therein electrical current paths between electrodes which are of relatively short first lengths, said groups being relatively widely spaced within said chamber to define electrical current paths in the glass constituents between groups which are long relative to said first lengths;
 first switching means for selectively coupling said phases of said source to individual electrodes of each of a plurality of said groups whereby said source is connected across electrodes of each of said groups; and
 second switching means from selectively coupling said source across at least one electrode of each of a plurality of said groups.

13. An electric furnace as defined in claim 12 wherein said first switching means connects electrodes of respective groups in a mesh connection across phases of said source.

14. An electric furnace as defined in claim 12 wherein said first switching means connects electrodes of respective groups in an open star connection across phases of said source.

15. An electric furnace as defined in claim 12 wherein said first switching means connects electrodes of respective groups in a neutral star connection across phases of said source.

16. An electric furnace as defined in claim 12 wherein said second switching means connects at least one electrode of each of a plurality of said groups to couple said groups in a mesh connection across phases of said source.

17. An electric furnace as defined in claim 12 wherein said second switching means connects at least one electrode of each of a plurality of said groups to couple said groups in an open star connection across phases of said source.

18. An electric furnace as defined in claim 12 wherein said second switching means connects at least one electrode of each of a plurality of said groups to couple said groups in a neutral star connection across phases of said source.

19. A circuit for starting an electric furnace for resistive heating of molten glass, comprising:
 a source of alternating current having a first plurality of outputs with phased output voltages;
 a first plurality of relatively closely spaced electrodes equal in number to said first plurality of outputs adapted for engagement with the molten glass;
 a second plurality of relatively widely spaced electrodes spaced a distance from each other and each of said first plurality of electrodes which is at least several times the distance between electrodes of said first plurality and adapted for engagement with the molten glass; and
 switching means having a first switch position for connecting each one of said first plurality of electrodes to a corresponding output of said first plurality of outputs and a second switch position for disconnecting all but one of said first plurality of electrodes from said corresponding outputs and connecting each one of said second plurality of electrodes to said previously disconnected corresponding outputs.

20. A circuit as defined in claim 19 including a third plurality of guard electrodes connected in parallel to said current source and adapted for engagement with the molten glass.

21. A circuit for starting an electric furnace for resistive heating of molten glass, comprising:
 a source of alternating current having first, second and third outputs for phased output voltages;
 first, second and third relatively closely spaced electrodes adapted for engagement with the molten glass;
 fourth and fifth electrodes adapted for engagement with the molten glass and spaced a distance from each other and said first, second and third electrodes which is at least several times the distance between said first, second and third electrodes; and switching means having a first switch position for connecting said first, second and third electrodes to said first, second and third outputs respectively and a second switch position for disconnecting said second and third electrodes from said second and third outputs and connecting said fourth and fifth electrodes to said second and third outputs respectively.

22. A circuit as defined in claim 21 wherein said first, second and third electrodes are spaced so as to define a substantially equilateral triangle.

23. A circuit as defined in claim 21 including a plurality of guard electrodes adapted for engagement with the molten glass and connected in parallel to said current source.

24. A circuit as defined in claim 23 wherein said current source includes a transformer having first, second and third primary windings connected between said first, second and third outputs and first, second and third secondary windings connected to said switching means.

25. A circuit for starting an electric furnace for resistive heating of molten glass, comprising:
 a source of alternating current having a first plurality of outputs with phased output voltages;
 a first plurality of relatively closely spaced electrodes equal in number to said first plurality of outputs and adapted for engagement with the molten glass; and switching means having a first switch position for connecting each one of said first plurality of electrodes to a correspnding output of said first plurality of outputs and a second switch position for disconnecting all but one of said first plurality of electrodes from said outputs and connecting all of said first plurality of electrodes in parallel.

26. A circuit as defined in claim 25 including a second plurality of guard electrodes adapted for engagement with the molten glass and connected in parallel to said current source.

27. A circuit for starting an electric furnace for resistive heating of molten glass, comprising:
a source of alternating current having first, second and third outputs for phased output voltages;
first, second and third relatively closely spaced electrodes adapted for engagement with the molten glass;
switching means having a first switch position for connecting said first, second and third electrodes to said first, second and third outputs respectively and a second switch position for disconnecting said second and third electrodes from said second and third outputs and connecting said second and third electrodes in parallel with said first electrode to said first output.

28. A circuit as defined in claim 27 wherein said first, second and third electrodes are spaced so as to define a substantially equilateral triangle.

29. A circuit as defined in claim 27 including a plurality of guard electrodes adapted for engagement with the molten glass and connected in parallel to said current source.

30. A circuit as defined in claim 27 including a transformer having first, second and third primary windings connected between said first, second and third outputs and having first, second and third secondary windings, said first secondary winding connected to said first, second and third electrodes in said second switch position.

31. A circuit as defined in claim 30 wherein said first, second and third electrodes are connected to said first, second and third outputs respectively in said first switch position.

32. A circuit as defined in claim 30 wherein said first, second and third electrodes are connected to said first, second and third secondary windings respectively in said first switch position.

33. A method of starting an electric furnace for resistive heating of molten glass, comprising the steps of:
bridging the space between a pair of relatively closely spaced electrodes with glass constituents;
connecting a source of alternating current between said electrodes with switching means in a first switch position to establish current flow to melt said glass constituents; and
switching said switching means to couple said current source between one of said electrodes and at least one relatively distantly spaced electrode immersed in said molten glass.

34. A method of starting an electric furnace as recited in claim 33 wherein said step of switching said switching means includes connecting said pair of electrodes in parallel.

35. A method of starting an electric furnace as recited in claim 33 wherein said step of bridging the space between said pair of electrodes includes placing relatively low resistivity material between said pair of electrodes.

36. A method of starting an electric furnace as recited in claim 33 wherein said step of bridging the space between said pair of electrodes includes surrounding said pair of electrodes with a relatively low resistivity material contained in a glass constraint.

37. A method of starting an electric furnace as recited in claim 33 including the step of applying radiant heat to melt said glass constituents between said pair of electrodes before connecting said current source.

38. A method of starting an electric furnace as recited in claim 35 including the step of applying radiant heat to melt said relatively low resistivity material between said pair of electrodes before connecting said current source.

39. A method of starting an electric furnace as recited in claim 35 wherein said relatively low resistivity material is sodium silicate.

40. A method of starting an electric furnace for resistive heating of molten glass which is of relatively high resistivity at melting and refining temperatures, comprising the steps of:
surrounding a first plurality of electrodes with cullet of the composition of the molten glass;
placing relatively low resistivity material between each pair of electrodes in said first plurality of electrodes;
connecting a source of alternating current between each pair of said first plurality of electrodes with switching means in a first switch position to establish current flow to melt said glass cullet; and
switching said switching means to a second switch position which connects said current source between an electrode relatively remote from said electrodes of said first plurality.

41. A method of starting an electric furnace as recited in claim 40 including the step of applying radiant heat to melt said relatively low resistivity material before connecting said current source between each pair of said first plurality of electrodes.

42. A method of starting an electric furnace as recited in claim 40 wherein said step of placing said relatively low resistivity material between each pair of electrodes includes surrounding said first plurality of electrodes with said relatively low resistivity material contained in a glass constraint in said glass cullet.

43. A method of starting an electric furnace as recited in claim 40 wherein said relatively low resistivity material is sodium silicate.

* * * * *